Figure 2:
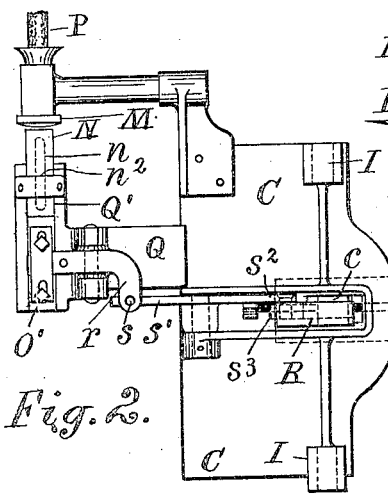

No. 808,851. PATENTED JAN. 2, 1906.
F. J. LUDINGTON.
APPLIANCE FOR CUTTING OFF AND CREASING CIGARETTES.
APPLICATION FILED MAR. 14, 1905.

4 SHEETS—SHEET 1.

Attest:
L. Lee.
Arthur F. Heaton.

Inventor.
Frank J. Ludington,
per Thomas S. Crane Atty.

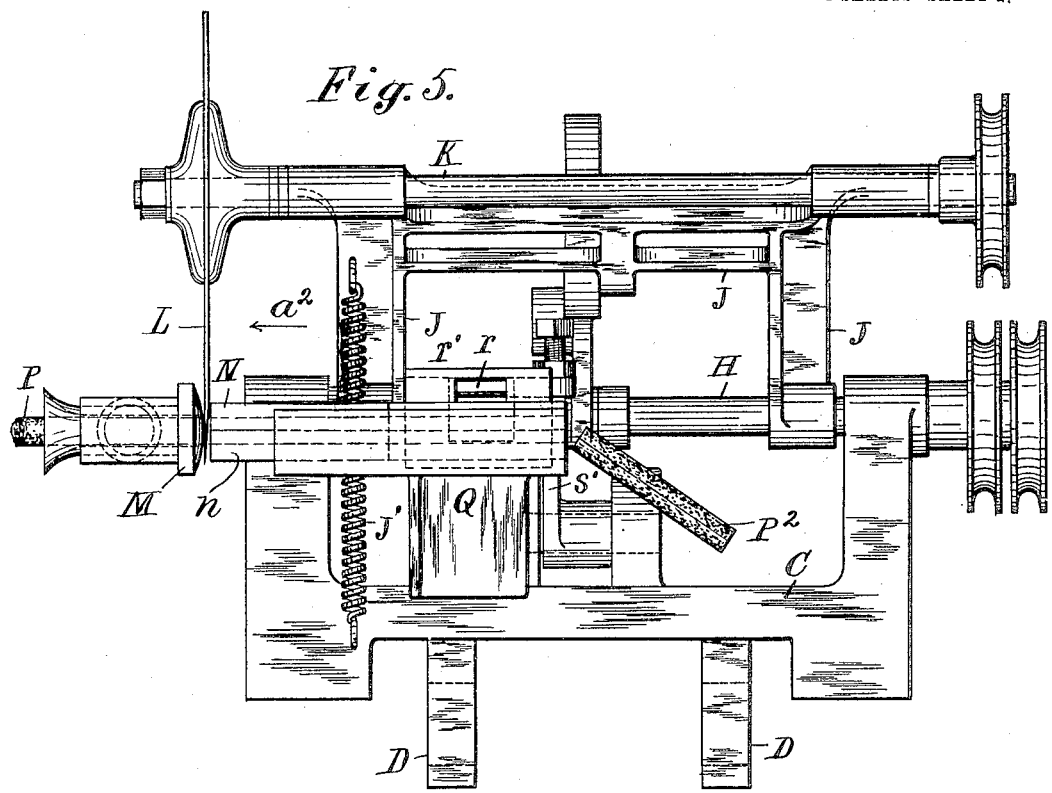
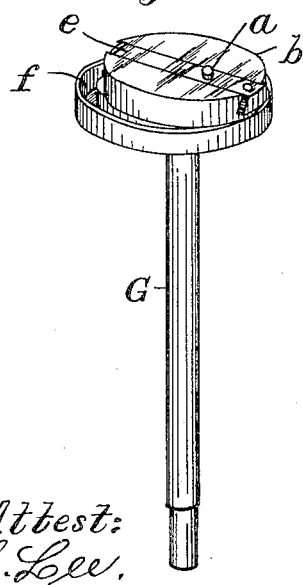
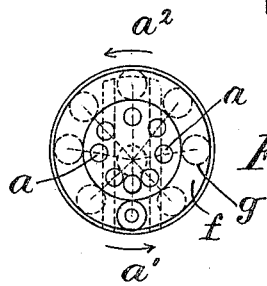
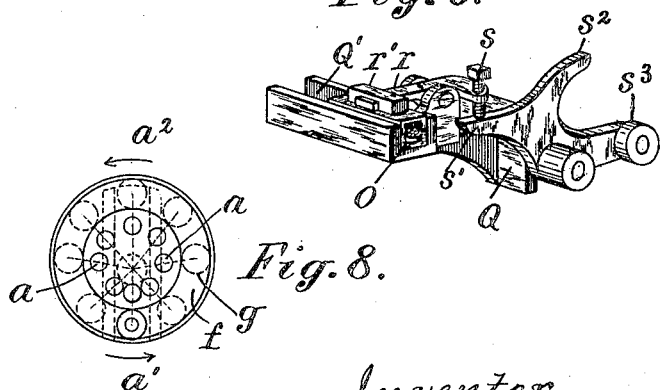

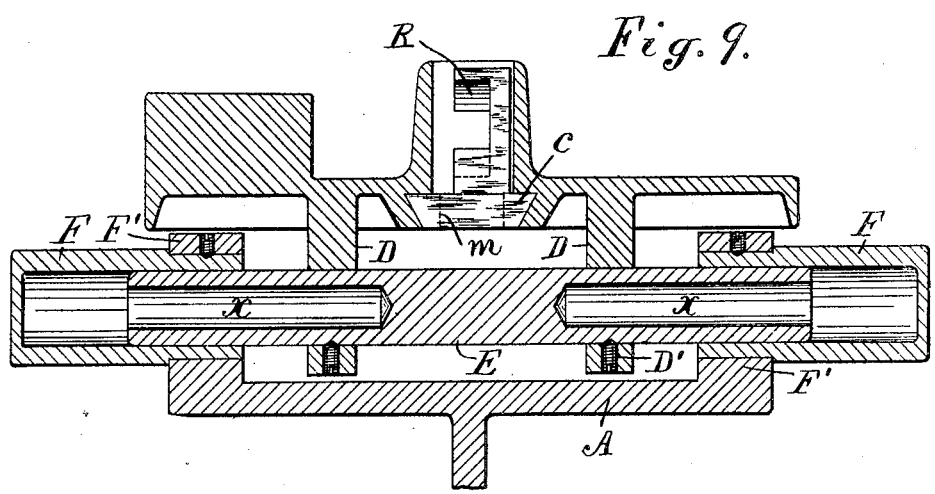
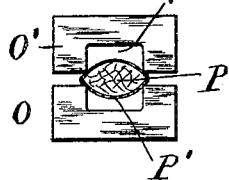
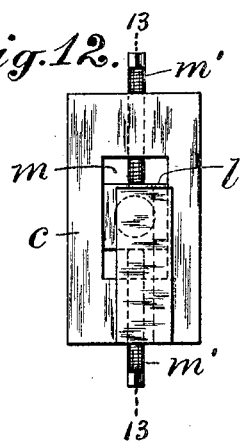
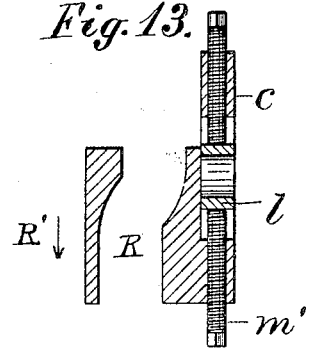
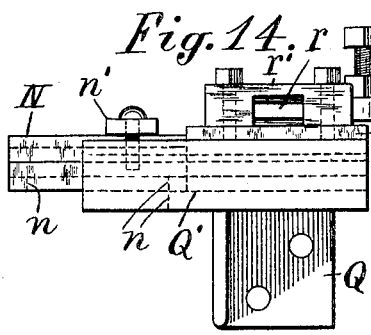
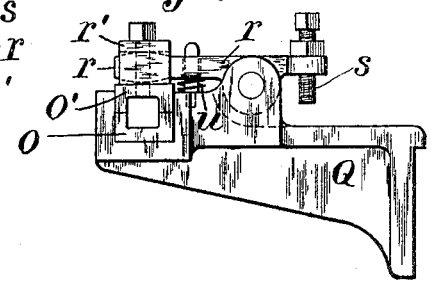

UNITED STATES PATENT OFFICE.

FRANK J. LUDINGTON, OF WATERBURY, CONNECTICUT.

APPLIANCE FOR CUTTING OFF AND CREASING CIGARETTES.

No. 808,151. Specification of Letters Patent. Patented Jan. 2, 1906.

Application filed March 14, 1905. Serial No. 249,977.

*To all whom it may concern:*

Be it known that I, FRANK J. LUDINGTON, a citizen of the United States, of 63 Bank street, Waterbury, county of New Haven, State of Connecticut, have invented certain new and useful Improvements in Appliances for Cutting Off and Creasing Cigarettes, fully described and represented in the following specification and the accompanying drawings, forming a part of the same.

The present invention relates to continuous cigarette-machines in which a cigarette-rod is divided into cigarettes by an automatic cutter; and the invention relates to certain improved means for creasing the edges of oval cigarettes and to means for regulating the operation of the cutter upon the cigarette-rod.

In manufacturing oval or so-called "Egyptian" cigarettes from a continuous rod the means for filling, shaping, and seaming the wrapper of the rod do not commonly produce sharp corners upon the cigarette, and special creasing dies have heretofore been patented to operate upon the corners of the cigarette to crease the same, and such dies have been shaped to fit the entire surface of the rod and to press the same while creasing the edges. I have found that such a pressure upon the surface of the cigarette-rod positively interferes with the creasing of the edges, and the present construction consists partly in the provision of creasing-dies having a channel to clear the body of the cigarette and longitudinal edges adapted to clamp the opposite edges of the wrapper, whereby the entire pressure of the dies is confined to the edges of the wrapper, and thus operates more effectively to crease the same.

In continuous-rod machines the cutter can only operate by moving longitudinally with the cigarette during the cutting operation, and the cutter-carriage is therefore commonly reciprocated parallel with the cigarette-rod by connection with a revolving crank. Difficulty has, however, been encountered in producing with such a crank motion precisely the desired speed of the carriage during the cutting operation, and the present invention includes a peculiar form of crank having a crank-pin mounted upon a transverse slide and its movement controlled by a cam which can be adjusted to vary the movement and consequent velocity of the cutter-carriage.

In the present invention the cutter upon the carriage is actuated by a cam which is mounted adjustably upon a slide fitted transversely to the cutter-carriage and journaled upon the crank-pin which reciprocates the carriage. By adjusting this cam upon the transverse slide the contact of the cutter with the cigarette-rod may be advanced or retarded, so as to sever the rod at the most favorable moment when the speed of the carriage and of the rod are exactly equal.

The invention also includes means for cushioning the rapid movement of the cutter-carriage, so that its motion may be reversed without shock or jar.

These improvements will be understood by reference to the annexed drawings, in which—

Figure 1:
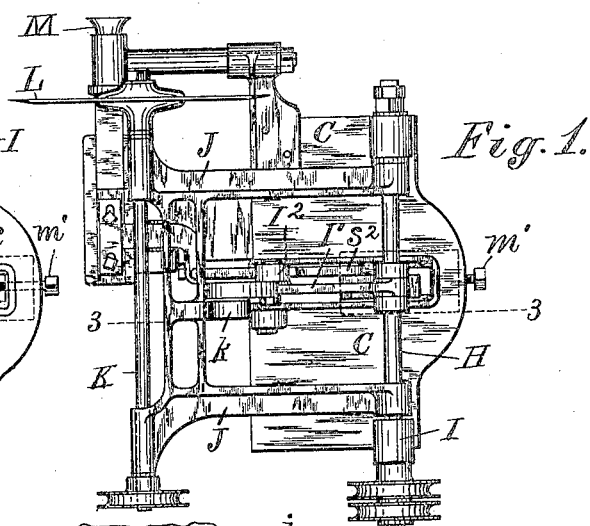
Figure 4:
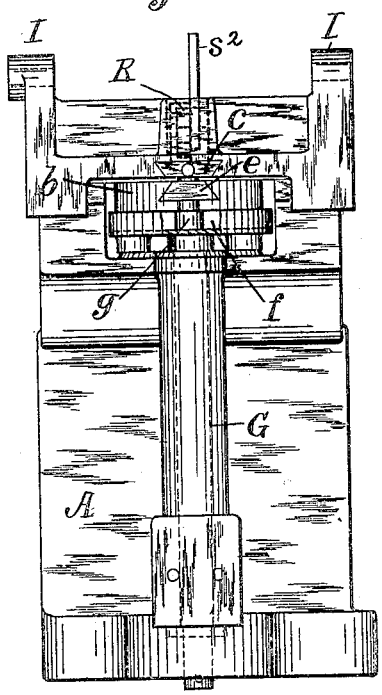
Figure 3:
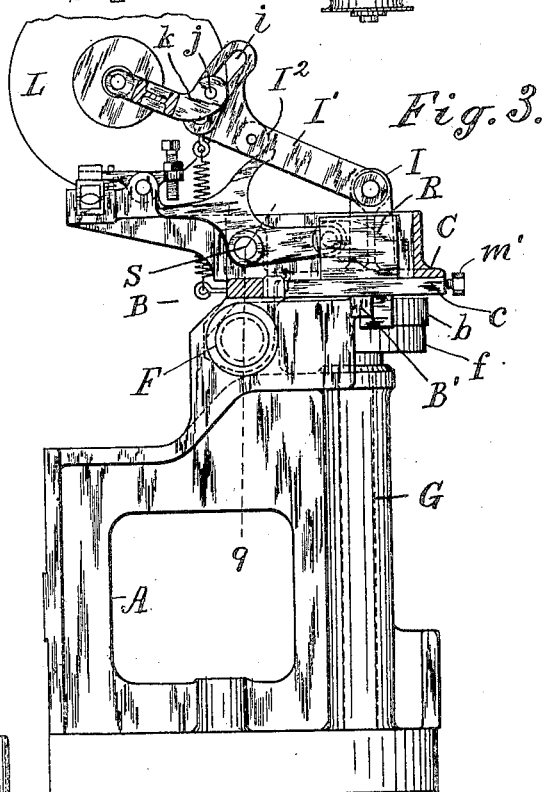
Figure 16:
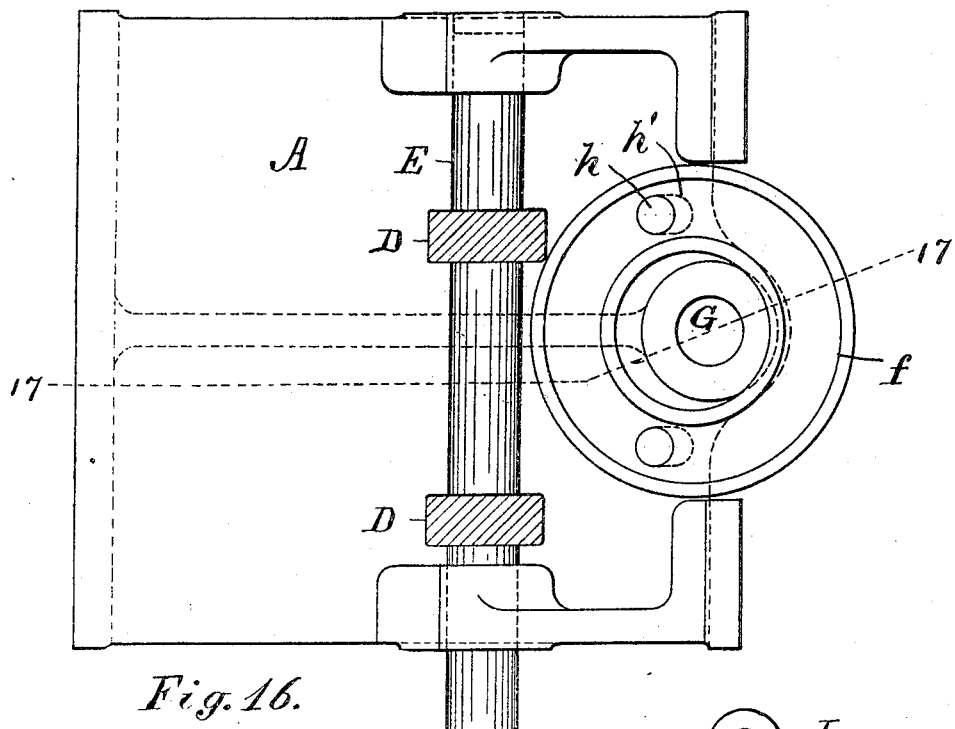
Figure 17:
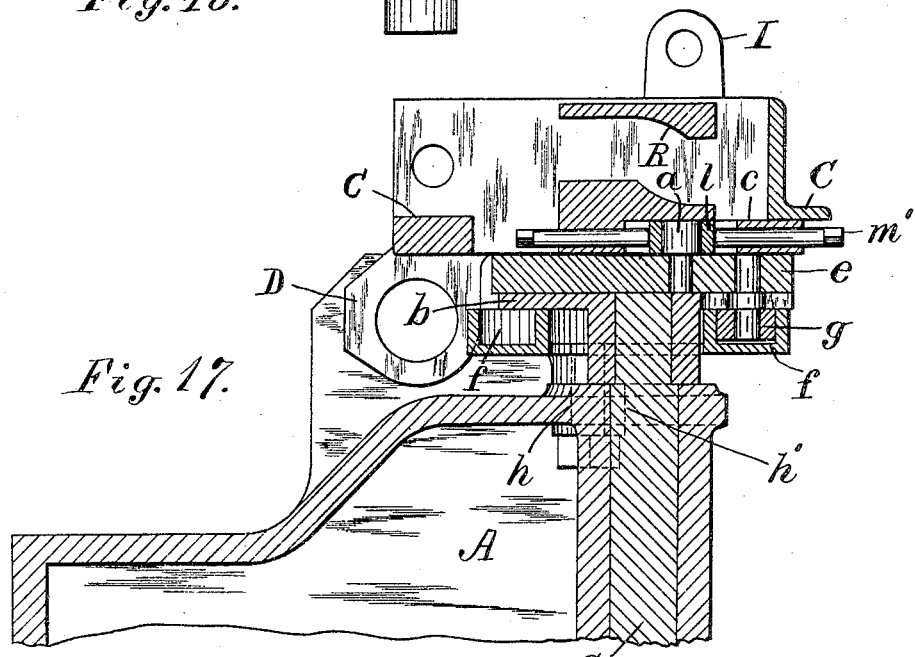

Figure 1 is a plan of the cutter-carriage and its attachments. Fig. 2 is a plan of the carriage with the cutter supporting and adjusting devices removed. Fig. 3 is an end elevation of the cutter-carriage and a standard for supporting the same movably, the view being taken in section on line 3 3 in Fig. 1. Fig. 4 is a rear elevation of the same parts with the edge of the cam-ring broken away to expose to view the roller therein. Fig. 5 is a front elevation of the cutter-carriage detached from the standard. Fig. 6 is a perspective view of the creasing-dies and the rocker which actuates the same. Fig. 7 is a perspective view of the traveling crank-pin and the adjustable cam-ring. Fig. 8 is a plan of the cam-ring with diagrammatic representation of the crank-pin in various positions. Fig. 9 is a vertical section of the carriage and the top of the standard, taken on line 9 9 in Fig. 3, showing the cushioning devices for the carriage. Fig. 10 is an end view of the creasing-dies when receiving a cigarette; and Fig. 11 is an end view of the same with the edges of the cigarette creased thereby. Figs. 5, 9, 10, and 11 are upon an enlarged scale. Fig. 12 is a plan of the cam-slide, and Fig. 13 a longitudinal section of the same on line 13 13 in Fig. 12. Fig. 14 is a front elevation, and Fig. 15 a side elevation, of the creasing-dies and their supporting and actuating mechanism. Fig. 16 is a plan of the standard with the cam-ring and showing the ears *d* in horizontal section and the plunger attached thereto. Fig. 17 is a section taken on line 17 17 in Fig. 16 with the carriage and its actuating devices.

The embodiment of the invention shown in the drawings is adapted for use with a certain class of cigarette-machine illustrated in my prior patent, No. 763,991, dated July 5, 1904; but the same mechanism may be adapted to other machines and present a materially different form to coöperate therewith. As the operation of a reciprocating cutter-carriage is fully shown in the said patent, I have only shown in the present application the cutter-operating fixtures with my improvements attached thereto.

In Figs. 3 and 4, A designates a standard furnished with parallel bars B B', upon which the carriage C is mounted movably. A gib fits beneath the bar B', and the carriage is held upon the bar B by ears D, carrying a pneumatic plunger E, the ends of which are fitted into air-chambers F, held over opposite ends of the plunger upon the top of the standard. The carriage is reciprocated upon the bars B B' by a crank-pin $a$, driven by a crank-shaft G, which is shown mounted vertically in the standard; but the crank may be operated by a horizontal shaft with the same effect upon the carriage. The plunger E being carried by the carriage compresses the air in the chambers F, and thus arrests the carriage without shock at the opposite ends of its stroke. A cutter-pivot H is journaled in ears I upon the carriage, and a cutter-frame J is hinged upon such pivot, and the cutter-shaft K journaled therein, with cutter L at one end.

*Cutter - reciprocating mechanism.*—The shaft G carries a crank-plate $b$ just beneath the carriage C, with a crank-slide $e$ movable transversely in the crank-plate to carry the crank-pin $a$. A dovetailed cam-slide $c$ is fitted to the carriage transverse to its movement and journaled upon the crank-pin $a$. A cam-ring, furnished upon its upper side with an annular groove $f$, (see Figs. 8 and 16,) is secured adjustably beneath the crank-plate $b$, and a stud upon the crank-slide $e$ carries a roll $g$ to engage the groove. The cam-ring is secured to the standard beneath the crank-plate by bolts $h$, fitted to slots $a'$ in the top of the standard, and the ring can thus be set eccentrically to the crank-plate, as shown in Figs. 7 and 16, thus causing the crank-pin $a$ to move eccentrically to the shaft G. Fig. 8 illustrates diagrammatically such movement of the crank-pin, the crank-pin being represented in eight positions, into which it is moved by the travel of the roll $g$ in the cam-groove $f$. In the upper part of Fig. 8 the crank-pin $a$ is shown at a much greater distance from the center of the shaft G than in the lower part of the same figure, which produces a higher velocity of the crank-pin when in the upper position. An arrow $a'$ shows the movement of the crank-pin in Fig. 8 when the cutter is severing the cigarette-rod. By adjusting the cam-ring beneath the crank-plate the velocity of the crank-pin can be varied, so that the speed of the carriage may be adjusted accurately to the speed of the cigarette-rod.

*Cutter-actuating devices.*—The cutter-frame J is pressed normally toward the ledger-plate tube to sever the cigarettes by a spring J' (shown in Figs. 3 and 5) and is supported intermediate to the cutting operation by the toe $s^2$ upon a rocker-dog. The dog is lowered at a suitable time by a cam upon the transverse slide to lower the cutter and sever the cigarette. To adjust the cutter-frame vertically to compensate for wear of the cutter, an adjusting-arm I' is hinged upon the cutter-pivot $h$ and is connected by a slot $i$ and bolt $j$ with an ear $k$ upon the cutter-frame. The adjusting-arm carries a roll $I^2$, which is pressed upon the toe $s^2$ by the spring J'. The adjusting-arm is moved intermittently up and down by the rocker-dog, and the cutter participates in the same movement wherever the bolt $j$ may be secured in the slot $i$. The cam-slide $c$ is moved transversely of the carriage as the carriage moves longitudinally and is provided with an upward projection having a cam-groove R, which engages a roll $s^3$ upon a rocker-dog pivoted at S upon the carriage. The rocker-dog has also a toe $s'$ to actuate the creasing-dies and has a rearwardly-projecting arm carrying the roll $s^3$ in engagement with the cam-groove R. The transverse movement of the slide causes the cam to depress the roll $s^3$, which simultaneously lowers the toe $s^2$ and elevates the toe $s'$. The transverse slide $c$ is termed the "cam-slide" hereinafter, as it carries the cam-groove R, and it is connected adjustably with the crank-pin $a$ to regulate and vary the time for operating the cutter. The connection with the crank-pin $a$ is effected by a journal-block $l$, fitted upon the crank-pin and also fitted movably to a slot $m$ in the cam-slide $c$. Screws $m'$ at opposite ends of the cam-slide serve to adjust the block $l$ longitudinally, and as the block has a uniform stroke the relation of the cam-groove R to the stroke is thus varied, so that the cutter may be operated sooner or later in the stroke.

*Actuation of the creasing-dies.*—A cigarette-guide M is supported upon the cutter-carriage adjacent to the edge of the cutter, and a ledger-plate tube N is supported adjacent thereto, being made of the same length as one cigarette, and the creasing-dies O and O' are supported adjacent to the end of the ledger-plate tube and made of the same length. The cutter operates between the end of the guide M and the ledger-plate tube N, and the cigarettes delivered to the ledger-plate tube are pushed forward successively into the creasing-dies by the cigarette-rod P. The ledger-plate tube and the dies are supported upon a bracket Q, having a channel or groove Q' in the front end, as shown in Fig. 6, to receive the ledger-plate tube and the dies. The creasing-dies are shown in the groove in Fig. 6 and a lever $r$, pivoted upon the bracket Q and engaging a yoke $r'$ upon the upper creasing-die O'. A spring $u$ normally lifts the creasing-die O' and presses the tail of the lever $r$ downwardly toward the toe $s'$ upon the rocker-dog. When the roller $s^3$ is depressed by the forward movement of the cam-slide, (indicated by arrow R' in Fig. 13,) the toe $s'$ is lifted into contact with a set-screw $s$ upon the tail of the lever, which operates to press the creasing-die O' toward the creasing-die O. The screw $s$ is provided to regulate the pressure, as the rocker-dog has a uniform movement due to the cam-groove R, which may operate to press the upper die more or less toward the lower die, according to the adjustment of the screw.

The dies are normally separated, as shown in Fig 10, and are formed each with a clearance-groove $v$ to avoid contact with the upper and lower surfaces of the cigarette-wrapper P' and with sharp corners adapted to engage the extreme opposite edges of the wrapper, as shown in Fig. 2, when the cigarette is advanced from the ledger-plate tube. When the dies are closed by the action of the lever $r$, the sharp corners operate to pinch the extreme opposite edges of the wrapper, as shown in Fig. 11, but do not contact with the curved surface of the cigarette. Instead of being distributed over the whole surface of the cigarette, as in the dies of curved cross-section which are used for simultaneously pressing and creasing cigarettes, the pressure by my construction is concentrated exclusively upon the corners of the dies and the edges of the wrapper and is thus much more effective in creasing the paper.

In Fig. 15 the dies are shown without any cigarette in them, and the square form of the channel shown in Figs. 10, 11, and 15 avoids any contact with the curved surface of the wrapper. The ledger-plate tube is made in halves for convenience of manufacture and grooved like the guide M to snugly fit and support the cigarette during the cutting operation and to subsequently guide it between the creasing-dies. The halves of the ledger-plate tube are clamped in the holder Q', as shown in Fig. 2 and Fig. 14, by a cap $n'$, with screws at opposite ends, which permits the removal of the halves to substitute others when desired for cigarettes of different shape.

In Fig. 2 a slot $n$ is shown extended through the bottom of the ledger-plate tube and through the bottom of the channel Q', which supports it, and such slot is also indicated by the dotted lines lettered $n$ in Figs. 5 and 14. Such slot serves to discharge any tobacco-chips which may be received from the guide $u'$ with the cut cigarettes, and thus avoids any obstruction to the free movement of the cigarette in the ledger-plate tube when pushed by the following cigarette-rod P. The movement of the rod which precedes each operation of the cutter discharges a creased cigarette from the creasing-dies, as shown at P² in Fig. 5.

*Cushioning of carriage.*—The plunger E (shown in Fig. 9) projects at opposite ends from the ears D, in which it is secured by set-screws D', and the air-chambers F are fitted to the ends of such plunger and secured in lugs F' upon the standard at the opposite sides of the lugs D and at a sufficient distance therefrom to permit the normal stroke of the carriage. The ends of the plunger are shown bored with recesses $x$, and the air in the recesses and within the chambers is of sufficient volume to bear compression without excessive resistance to the movement of the carriage and yet bring it to rest as it is reversed without shock or jar. It will be understood (and is fully shown in Fig. 9) that the air-chambers F are in continuous engagement with the ends of the plunger E, so as to operate continuously throughout the stroke of the carriage and not intermittently like ordinary air-buffers. It will also be understood that there is no outlet required from the chambers $f$, but that the air therein is subject constantly to compression and expansion, as the plungers move back and forth continuously within such chambers. The force exerted by the air in one of the air-chambers when the plunger is moving out of the same operates simultaneously with the force required for compressing the air in the opposite air-chamber while the plunger is moving into the same, and the parts are so proportioned that such expansion and compression of the air offer no injurious resistance to the movement of the carriage, but cause the reversal of its movement to be effected without shock. Such cushioning of the carriage permits it to be reversed with great rapidity, as is necessary in operating an automatic cigarette-making machine.

*Operation of the cutting and creasing devices.*—The cigarette-rod is delivered continuously to the cutting appliances at uniform speed; but the carriage, being reciprocated by the rotating crank-pin $a$, moves at a variable speed, which at a certain time is equal to that of the rod, and at such time the cutter is actuated, as shown in Fig. 5, to sever the rod. After the rod is severed the cutter is retracted, and the carriage, when the crank-pin reaches the position at the right of Fig. 8, is reversed, so that the carriage moves toward the rod in the direction of the arrow $a^2$ in Figs. 5 and 8. During this movement the cutter remains elevated and the creasing-dies open. When the crank-pin reaches the position at the left of Fig. 8 and the carriage again reverses, it soon afterward attains the speed of the cigarette-rod, and the cam R on slide $c$ then permits the cutter to sever the cigarette. When the carriage is half-way back to its intermediate position, the cam-slide c is all the way forward, and the toe s' upon the rocker-dog then closes the creasing-dies and creases the cigarette. At this time the carriage is moving faster than the cigarette-rod, and the two cigarettes (in the ledger-plate tube) and the dies therefore move ahead of the remainder of the rod; but in the reverse movement the cigarettes contact with the forward cut end of the cigarette-rod and are pushed forward the length of one cigarette.

*Compensation for the attachments.*—It will be observed that any change in the adjustment of the slide c upon the crank-pin a by shifting its journal-block l causes the cam-groove r to actuate the rocker-dog earlier or later in the movement of the crank, and such adjustment cannot after the creasing-dies have been properly adjusted be made to vary the operation of the cutter without deranging the operation of the creasing-dies. To compensate for such derangement, the set-screw s is provided upon the lever r, which moves the creasing-dies. The set-screw s and the adjustment of the cam-slide c can thus both be changed at any time after it has been found necessary to change the adjustment of the cam-ring f, so as to restore the proper relation of the movement of the creasing-dies to the movement of the cutter.

The provision of means for varying the eccentric movement of the crank-pin, so as to effect the speed of the carriage, the adjustable connection of the transverse slot c with the crank-pin, and the adjustable connection of the slide with the cutter and with the movable creasing-die produce a mechanism which overcomes the difficulties heretofore encountered in cutting the cigarettes from the cigarette-rod and in creasing the wrapper, so as to produce sharp edges upon an oval cigarette.

If there be any defect in the adjustment of the carriage movement to the movement of the cigarette-rod, the cutter does not divide the cigarettes from the rod with a perfectly-square cut, and the cigarettes are consequently disfigured by an oblique cut; but with the mechanism described herein the cigarette is cut off and creased in a most satisfactory manner at any speed that is desirable in operating a continuous-cigarette machine. I have therefore claimed the means for creasing the edges of the wrapper only and the various mechanical features by which the different movements are adjusted in relation to one another.

Having thus set forth the nature of the invention, what is claimed herein is—

1. In a continuous-cigarette machine, the means for dividing the cigarette-rod, consisting of a standard supporting a driving-shaft with crank-plate upon the shaft, a carriage movable longitudinally upon the standard, a cam-slide movable transversely upon the carriage and provided with a cam-groove, a crank-slide freely movable transversely upon the crank-plate and having a crank-pin fitted to the cam-slide to reciprocate the cam-slide and carriage transversely to one another, a cigarette-cutter mounted upon the carriage, means actuated by the cam-slide for moving the cutter to and from the cigarette-rod, and means fixed upon the standard for governing the transverse movement of the crank-slide.

2. In a continuous-cigarette machine, the means for dividing the cigarette-rod, consisting of a standard supporting a driving-shaft with crank-plate upon the shaft, a carriage movable longitudinally upon the standard, a cam-slide movable transversely upon the carriage, a block adjustable upon the cam-slide and provided with a cam-groove, a crank-slide freely movable transversely upon the crank-plate and having a crank-pin fitted to the cam-slide to reciprocate the cam-slide and carriage transversely to one another, a cigarette-cutter mounted upon the carriage, means actuated by the cam-slide for moving the cutter to and from the cigarette-rod, and means fixed upon the standard for governing the transverse movement of the crank-slide.

3. In a continuous-cigarette machine having a cutter-carriage reciprocated for cutting the cigarette-rod while in motion, the combination, with the carriage, of a slide movable transversely thereon, a crank-plate having a crank-slide with crank-pin fitted to such transverse slide, and a cam for governing the motion of the crank-slide and thereby controlling the velocity of the cutter-carriage at the moment of cutting.

4. In a continuous-cigarette machine having a cutter-carriage reciprocated for cutting the cigarette-rod while in motion, the combination, with the carriage, of a slide transverse to its movement, a crank-plate adjacent to such slide, a crank-slide movable transversely upon the crank-plate with crank-pin journaled to the slide and a cam-stud projected from the opposite side of the crank-slide, and a cam-ring fitted to the stud and held adjustably adjacent to the crank-plate to guide the stud and control the movement of the crank-pin.

5. In a continuous-cigarette machine, the means for dividing the cigarette-rod, consisting of a standard supporting a driving-shaft with crank-plate upon the shaft, a carriage movable longitudinally upon the standard, a cam-slide movable transversely upon the carriage and provided with a cam-groove, a cigarette-cutter mounted upon the carriage, means actuated by the cam-slide for moving the cutter to and from the cigarette-rod, a crank-slide movable transversely upon the crank-plate and having a crank-pin fitted to the cam-slide to reciprocate the slide and carriage transversely to one another, a cam-ring attached to the standard adjacent to the crank-plate, and a stud upon the crank-slide fitted to the cam-groove to control the movement of the crank-pin.

6. In a continuous-cigarette machine, the means for dividing the cigarette-rod, consisting of a standard supporting a driving-shaft, with crank-plate upon the shaft, a carriage movable longitudinally upon the standard, a cam-slide movable transversely upon the carriage and provided with a cam-groove, a cigarette-cutter mounted upon the carriage and means actuated by the cam-slide for moving the cutter to and from the cigarette-rod, a crank-slide movable transversely upon the crank-plate and having a crank-pin fitted to the cam-slide to reciprocate the slide and carriage transversely to one another, a cam-ring secured adjustably upon the standard adjacent to the crank-plate, and a stud upon the crank-slide fitted to the cam-ring to control adjustably the movement of the crank-pin.

7. In a continuous-cigarette machine, the combination, with means for forming the cigarette-rod and dividing the same into cigarettes, of creasing-dies having a channel adapted to clear the body of the cigarette with longitudinal edges adapted to crease the opposite edges of the cigarette-wrapper, and means for operating the creasing-dies.

8. In a continuous-cigarette machine, the combination, with means for forming the cigarette-rod, of a cutter for dividing the cigarette-rod, a carriage for the cutter traversed longitudinally with the cigarette-rod, a cam-slide movable transversely upon the carriage and provided with a cam-groove, a crank having pin fitted to the slide to reciprocate the slide and carriage transversely to one another, means actuated by the cam-slide for moving the cutter to and from the cigarette-rod, a guide upon the carriage to support the cigarette when divided by the cutter, a creasing-die fixed upon the carriage adjacent to such guide to receive the cigarettes successively, a creasing-die movable to and from the same and means actuated by the cam-slide for moving such creasing-die.

9. In a continuous-cigarette machine, the combination, with means for forming the cigarette-rod and dividing the same into cigarettes, of a cutter for dividing the cigarette-rod, a carriage for the cutter traversed longitudinally with the cigarette-rod, a cam-slide movable transversely upon the carriage and provided with a cam-groove, a crank having pin fitted to the slide to reciprocate the slide and carriage transversely to one another, means actuated by the cam-slide for moving the cutter to and from the cigarette-rod, a guide upon the carriage to support the cigarette when divided by the cutter, a creasing-die fixed upon the carriage adjacent to such guide to receive the cigarettes successively, a creasing-die movable to and from the same, a lever $r$ pivoted upon the carriage and moved by the cam-slide to actuate such die, and an adjustable connection between such die and the lever to operate the die as desired.

10. In a continuous-cigarette machine, the combination, with means for forming the cigarette-rod, of a cutter for dividing the cigarette-rod, a carriage for the cutter traversed longitudinally with the cigarette-rod, a slide movable transversely upon the carriage and provided with a cam-groove, a crank having pin fitted to the slide to reciprocate the slide and carriage transversely to one another, a rocker-dog journaled upon the carriage with arm oscillated with the cam-groove, a cutter-frame pivoted on the carriage with a cutter having spindle journaled therein, a guide upon the carriage to support the cigarette when divided by the cutter, a creasing-die supported upon the carriage adjacent to such guide to receive the cigarette successively, a creasing-die movable to and from the same, a toe upon the rocker-dog to actuate such movable die, and an adjustable connection between such die and the toe, to adjust the movable die as desired.

11. In a continuous-cigarette machine, the combination, with the means for forming the cigarette-rod, of a cutter-carriage traversed longitudinally with the cigarette-rod, a cutter-frame pivoted upon the carriage, a cutter-spindle journaled upon the cutter-frame with rotary cutter thereon, a slide movable transversely upon the carriage and provided with a cam-groove, a crank having pin fitted to the slide to reciprocate the slide and carriage transversely to one another, a rocker-dog journaled upon the carriage with arm oscillated by the cam-groove, the toe $s^2$ upon the rocker-dog, and an adjustable connection between the toe and the cutter-frame to compensate for the wear and gradual reduction of the cutter.

12. In a continuous-cigarette machine, the combination, with the means for forming the cigarette-rod, of a cutter-carriage having a cigarette-guide traversed longitudinally with the cigarette-rod, the cutter-frame J journaled to the pivot H upon the carriage and pressed normally toward the cigarette-guide, a cutter-spindle journaled upon the cutter-frame with rotary cutter thereon, a cam-slide movable transversely upon the carriage and provided with a cam-groove, a crank having a pin fitted to the cam-slide to reciprocate the cam-slide and carriage transversely to one another, a rocker-dog journaled upon the carriage with arm oscillated by the cam-groove, the toe $s^2$ upon the rocker-dog, and the arm I' hinged upon the pivot H and having roll $I^2$ to contact with the toe $s^2$ and connected adjustably with the cutter-frame, as and for the purpose set forth.

13. In a continuous-cigarette machine, the combination, with means for forming and propelling the cigarette-rod, of a cutter for dividing the cigarette-rod, a carriage for the cutter, the guide M provided with ledger-plate tube N adjacent to the path of the cutter, the ledger-plate tube having in the bottom the slot $n$ to discharge any chips received with the cut cigarettes, and dies arranged adjacent to the ledger-plate tube to crease the cigarettes received therefrom, the guide M, the ledger-plate tube N and the dies being supported by the cutter-carriage and reciprocated therewith, substantially as herein described.

14. In a continuous-cigarette machine, the combination, with a suitable standard, of a cutter-carriage having a cigarette-guide traversed longitudinally with the cigarette-rod, a cutter mounted upon the carriage, means for reciprocating the carriage upon the standard and for actuating the cutter, a double-ended plunger movable with the carriage, and the air-chambers F arranged upon the standard to continuously engage the ends of the plunger and regulate the movements of the carriage throughout its entire stroke, substantially as herein set forth.

15. In a continuous-cigarette machine, the combination, with a suitable standard, of a cutter-carriage having a cigarette-guide traversed longitudinally with the cigarette-rod, a cutter mounted upon the carriage, means for reciprocating the carriage upon the standard and for actuating the cutter, the carriage having the ears D projected toward the top of the standard and provided with the double-ended plunger E, and the standard having the lugs F' projected toward the carriage and provided with the air-chambers F in continuous engagement with the ends of the plunger E, to regulate the movements of the carriage throughout its entire stroke.

16. In a continuous-cigarette machine, the combination, with a suitable standard, of a cutter-carriage having a cigarette-guide traversed longitudinally with the cigarette-rod, a cutter mounted upon the carriage, means for reciprocating the carriage upon the standard and for actuating the cutter, the carriage having the ears D projected toward the top of the standard and provided with the double-ended plunger E having recesses $x$ in the ends, and the standard having the lugs F' projected toward the carriage and provided with the air-chambers F in continuous engagement with the ends of the plunger E, to regulate the movements of the carriage throughout its entire stroke.

17. In a continuous-cigarette machine the means for dividing the cigarette-rod and creasing the wrapper, consisting of a carriage, a cutter supported movably upon the carriage, creasing-dies supported upon the carriage in the path of the cigarette, a slide fitted transversely upon the carriage with adjustable connections to the cutter and to the movable creasing-die, a crank-plate having crank-slide fitted transversely thereon with a crank-pin engaging the transverse slide upon the carriage, and means for adjusting the movement of the crank-pin, whereby the operation of the crank-pin, the cutter and the creasing-die may all be adjusted in relation to one another.

In testimony whereof I have hereunto set my hand in the presence of two subscribing witnesses.

FRANK J. LUDINGTON.

Witnesses:
 THOMAS S. CRANE,
 L. LEE.